Patented Oct. 18, 1932

1,882,810

UNITED STATES PATENT OFFICE

HAROLD W. GREIDER, OF PLYMOUTH MEETING, PENNSYLVANIA, ASSIGNOR TO THE PHILIP CAREY MANUFACTURING COMPANY, A CORPORATION OF OHIO

POROUS MATERIALS AND THE MANUFACTURING PROCESS THEREOF

No Drawing.   Application filed April 18, 1928. Serial No. 271,108.

My invention relates to porous materials, particularly building materials and moulded heat insulations and the manufacturing process thereof. It is addressed to increasing the porosity of these products.

Increasing the porosity of the products above mentioned makes them lighter and less dense, reduces their cost and increases their heat insulating efficiency. My invention constitutes a distinct and additional improvement in heat-insulating materials and the manufacturing process thereof, which I have disclosed and claimed in my patent application, Serial No. 89,494, for heat-insulating materials, etc., filed February 19, 1926.

As in my application Serial No. 89,494 above referred to, my invention is applicable particularly to heat insulating materials, whether of magnesia, or magnesia and a binder such as asbestos or other suitable fibrous materials, or a combination of asbestos and plaster of Paris, either with or without a binder, and with or without diatomaceous earth or other suitable finely-divided materials. More generally, however, my invention relates to all heat insulating materials that are manufactured by mixing the solid materials with water, to form a fluid, or a plastic, or a semi-plastic mass, and then removing the water as by expulsion under pressure from filter molds and/or by permitting the water to be evaporated. I have found that excessive weight in such moulded insulating materials is due largely to a tendency of the minute mineral particles aggregates or flakes in the semi-plastic or fluid mass to compact or shrink under such influences as pressure and drying, so that the mass becomes more dense.

Not only does this compacting of the mineral particle aggregates or flakes add greatly to the weight of the finished material, but it also tends to, and does very largely, decrease the insulating efficiency of the moulded product by closing the minute voids or air spaces between the particles or flakes, upon which the insulating material depends for its efficiency in reducing the heat transfer through the mass.

I have found further that, if the plastic or semi-plastic mixture of the materials above referred to is allowed to stand for any length of time prior to moulding, as is often necessary in commercial operation, there is a pronounced tendency for the material to compact under its own weight, and it also tends to dry out, become lumpy and lose its plasticity, which tends to make the material difficult to mix and mould and which gives a moulded product of considerably increased density.

It is the usual practice in the commercial manufacture of moulded insulation to return to the mix a certain proportion of reground scrap material resulting from broken and damaged moulded insulation and from the trim from the planers and saws used in finishing the moulded shapes to the required dimensions. I have found that, if this reground material, commonly referred to as plastic, is returned to the mix, it has, due to the fact that it has previously been through both moulding and drying operations, considerably greater density than the fresh raw material used in the mix, and for this reason has a very pronounced effect in increasing the density of the final moulded product.

The reground scrap or plastic containing asbestos fibre or other fibrous binder is, when mixed with water to form a semi-plastic mass, usually of a somewhat spongy and lumpy texture, so that it is very difficult to aerate by means of mechanical agitation alone even with the aid of a bubble-forming and stabilizing agent.

My invention seeks to overcome the difficulties above stated and to more effectively decrease the density of moulded heat insulation, by forming within the semi-plastic mass prior to moulding, minute stabilized gas bubbles, said gas bubbles being produced by chemical reaction within the mixture in such a manner as to exert a powerful expanding or disrupting effect upon the spongy, lumpy or fibrous mass, due to the pressure developed within the stabilized gas bubbles as they are formed within the mix.

Since the gas enclosed within the stabilized bubbles is produced by chemical reaction within the mixture, I can produce within the mass a considerably greater proportion of minute bubbles, than it would be possible to introduce by merely mechanically agitating the mixture to entrap air bubbles. Furthermore, since the reacting substance which produces the gas is uniformly distributed and intimately co-mingled with the spongy, lumpy or fibrous materials of the mixture, its expanding or disrupting effect upon the compacted masses will be much greater than that of air bubbles mechanically introduced into the mixture.

I have found that it is advantageous to form minute bubbles in the mixture, because minute bubbles are mechanically much more stable, that is, much stronger than large bubbles, and therefore are not broken down and expelled from the mixture by the pressure used in moulding.

By my invention, I have found that a greater proportion of very minute bubbles can be produced and retained within the mass during the moulding process than when bubbles are mechanically introduced into the mixture.

I have found and it is a feature of my invention that, by introducing into the material while in a plastic, semi-plastic, or fluid condition, a substance which generates a gas by reaction with the water of the mix, each particle of said substance having a coating of a bubble-forming and stabilizing agent, I can produce a product in which there are created and retained a very large proportion of minute voids. The bubble-forming and stabilizing agent which I use for a coating for the gas-generating substance serves the further important purpose of retarding the reaction between the gas-generating substance and the water of the mix, thus preventing too rapid production of the gas.

The gas-generating substance which I prefer to use is granular or powdered calcium carbide. I have found, however, that calcium carbide cannot be directly mixed successfully with a mixture of insulating materials and water, because the reaction between the calcium carbide and the water, generating acetylene gas, is so violent that it is almost explosive and the gas is lost and no minute stable bubbles are formed within the mix. I therefore use a protective coating for the grains or particles of calcium carbide which retards the reaction between the carbide and the water. While various substances might be used as protective coatings or retarding agents, I have found that bubble-forming and stabilizing agents which are also film-forming and stabilizing (gas emulsifying) agents are particularly effective and serve the purposes stated above; that is, they prevent the gas being generated too rapidly and they also stabilize the gas in the mix in the form of an emulsion of very minute bubbles having mechanically strong pressure resisting bubble films.

I have found that a substance which is to serve satisfactorily as a protective coating for calcium carbide grains for the purposes of my invention should be an organic material which is soluble or colloidally dispersible in water (or which can be rendered soluble or colloidally dispersible in water by reaction with other substances incorporated in the mix); which is anhydrous, so that it will not itself react with calcium carbide; which is capable of coating the grains of calcium carbide with a virtually continuous, oily, waxy, saponaceous, or resinous protective layer so that, when the carbide is mixed with water, the access of the water to the surfaces of the grains will be so retarded as to permit only a gradual reaction and evolution of acetylene. The substance should also be preferably one which is a bubble-forming and stabilizing agent (or which can be converted into a bubble-forming and stabilizing agent by reaction with other substances incorporated in the mixture).

I have found that many bubble-forming and stabilizing agents meet the above requirements and can be used as protective coatings for calcium carbide grains. Film-forming and stabilizing agents (gas emulsifying agents) are preferable for use according to my invention as these agents promote the formation and stabilization of strong pressure resisting bubble films and the formation of a stable foam of minute bubbles of emulsified gas. When air or other gas in introduced into a water mix which contains a film-forming and stabilizing agent (gas emulsifying agent), the agent by its peculiar film-forming and stabilizing properties disperses the air or other gas as an emulsion of minute bubbles having strong tough films. While I do not regard any theory of their action which I may mention as essential to my invention, I believe that such agents produce strong tough films by causing a modification of the surface tension or a concentration of the agent in the bubble films or both. Moreover, when finely divided materials such as magnesia are included in the mix these agents tends to concentrate minute particles of the material in the bubble films making the films virtually armor plated, thus increasing their strength and stability and preventing the bubbles from rising to the surface and escaping. The use of film-forming and stabilizing agents (gas emulsifying agents) together with a substance which generates gas by chemical reaction in the mix either coated or not coated with a retarding agent, is a feature of my invention especially applicable where a mix is molded under pressure in filter-molds as hereinbelow described in connection with the manufacture of 85% magnesia. The following are film-forming and stabilizing agents (gas emulsifying agents) which are preferable for use according to my invention: sulphonated castor oil, sodium oleate, sodium stearate, sodium resinate, sulphonated oleic acid, sodium sulpho-ricinoleate, and sodium sulpho-oleate. Other substances which may be used as protective coatings for calcium carbide, which are not themselves bubble-forming and stabilizing agents or film forming and stabilizing (gas emulsifying) agents, but which can be converted into soaps which do function as such agents, by adding to the mix an excess of sodium hydroxide or other caustic alkali, to react with the organic acid, include the following substances: oleic acid, stearic acid, ricinoleic acid, palmitic acid, and rosin (abietic acid).

I have found that the protective coating or retarding agent may be coated on the calcium carbide grains in various ways. While various methods of forming the protective coating on the calcium carbide grains may be used, I have found it advantageous to adapt the method of coating to the properties of the agent used as the coating. If, for example, the coating material is a liquid such as sulphonated castor oil or oleic acid, the carbide may simply be drenched with the liquid and the excess liquid over that required to completely coat the grains may be drained off. If, for example, the coating material is solid at ordinary temperatures, as palmitic acid or rosin, it may be melted and admixed with the calcium carbide in the molten condition. After the mass has cooled and solidified, it may then be pulverized to restore the coated calcium carbide to a granular condition. An alternative method of coating the calcium carbide grains with an agent is to dissolve the agent in a suitable anhydrous volatile organic solvent, such as benzine, gasoline, carbon tetra chloride, or absolute alcohol. The calcium carbide grains are drenched with this solution, and the volatile solvent then permitted to evaporate, leaving a coating of the bubble-forming and stabilizing agent on the surfaces of the carbide grains.

I have found that ordinary lump calcium carbide cannot be successfully used in my improved process. While I do not wish to limit my invention to any particular grain size of calcium carbide, I have found that the results are most satisfactory if relatively fine-grained calcium carbide, having a grain size about that of coarse gunpowder, is used.

I have found that, when fine-grained calcium carbide is given a protective retarding coating of a film-forming and stabilizing agent, as above stated, and the coated carbide then immersed in water or in a mixture of water and powdered insulating materials, a stable foam or froth of emulsified gas is produced in which the bubbles are very minute and have strong, stable films.

While the successful use of my invention in securing the results stated is not dependent upon the correctness of any theory, which I may advance to explain the functioning of the materials used in the process, I believe that the reason for the very minute size and great stability of the bubbles is that as soon as a small quantity of gas has been released by the carbide reacting with water, it acquires a film of film-forming and stabilizing agent from the surface of the carbide grain and a minute stable bubble is formed.

I have heretofore been referring to moulded insulating materials generally and will now, for example, describe my invention as applied in the process and embodied in the product of the manufacture of the magnesia asbestos insulating material commonly called eighty-five per cent. magnesia. I have found that, by adding to the eighty-five per cent. magnesia mix prior to moulding a small quantity of fine-grained calcium carbide which has previously been given a protective retarding coating of a bubble-forming and stabilizing agent which is preferably a film-forming and stabilizing (gas emulsifying) agent, I can produce moulded eighty-five per cent. magnesia having a very great number of minute voids, in excess of the voids which occur in such product when manufactured without the use of the agent, and also in excess of the voids which occur in such product when manufactured with the use of a bubble-forming and stabilizing agent and mechanical agitation to introduce air into the mixture.

The quantity of the coated calcium carbide which I use depends on the micro-porosity required in the final moulded product, as the voids in the product can be increased by using a greater quantity of the calcium carbide or decreased by using a lesser quantity. The quantity of coated calcium carbide which it is advantageous to use will also dependent upon the quality and quantity of the asbestos fibre in the composition, since this fibre gives structural strength to the moulded mass. The quantity of the coated carbide which it is advantageous to use will also depend to a certain extent upon the proportion of reground material or plastic reincorporated in the mix, because the minute stabilized bubbles produced by the carbide are necessary to offset the increased density imparted to the final moulded product by the reground material. I have found that a very satisfactory product of low density can be produced by adding to a mix containing approximately two thousand pounds of magnesia by dry weight five pounds of calcium carbide, or about .25 of one per cent., which has been previously coated with about two pounds of sulphonated castor oil, or .1 of one per cent. I have found that equally satisfactory results are obtained by use of about five pounds of calcium carbide coated with about two pounds of sodium oleate or two pounds of sodium resinate.

I find that my invention can be used successfully in the manufacture of eighty-five per cent. magnesia without altering in any way the usual conditions of mixing and moulding the product under pressure in filter molds with expulsion of water. I find that it is advantageous if the mixture of magnesia, asbestos fibre and water is prepared of the same consistency as would be required in the absence of the coated calcium carbide and moulded at the same temperature: about 175° F.

It is a particular advantage of my invention that the generation of gas by calcium carbide does not involve any chemical reaction with the solid insulating materials which are ingredients of the mixture. Such reactions are undesirable because they destroy or modify the structure of the insulating substances.

I find that it is entirely practicable to mold the mixture under substantially the same pressure as is ordinarily used in the molding of eighty-five per cent. magnesia; that is, between twenty-five and forty pounds per square inch, because this pressure does not break down and expel from the mixture an unduly large proportion of the very minute stable bubbles. When the moulded product is dried in the usual manner, the minute voids thus created and maintained in the moulded product are retained forming what may be referred to as minute dried bubbles of a gaseous emulsion or foam. As the dried product made according to my invention has a substantially increased number of voids retained, it has lower density and greater insulating efficiency than would be the case without the use of my invention. The fact that the voids are very minute permits them to give the product increased lightness without sacrifice of mechanical strength. Moreover since heat insulation efficiency is increased much more by very minute voids than by coarse voids, the heat insulation efficiency of the product is increased to much greater extent than if the voids were coarse.

I preferably introduce the coated calcium carbide into the mixture in the mixing tank after the mixture has been brought to the required consistency for moulding. In order that the coated calcium carbide grains may be uniformly distributed and intimately commingled with the spongy fibrous and lumpy masses in the mixture, that is, to secure the most effective penetration of these masses by the gas-generating substance, I find that it is advantageous to mix the coated calcium carbide grains very thoroughly with the other ingredients of the mix.

While mechanical agitation, such as described in my pending application Serial No. 89,494 for the formation of minute bubbles within the mix is not essential to my process herein disclosed, it will be understood that it is entirely practicable to use mechanical agitation so that a certain proportion of the air thus introduced into the mix will be enclosed and stabilized in the form of minute bubbles due to the double-forming and stabilizing action of the coating agent on the calcium carbide grains.

If a plastic insulating cement is the product desired, it is usually produced by grinding to the desired fineness the trim from the planing of moulded blocks or sectional pipe covering or broken pieces of moulded insulation. I have found that the insulating cement thus made from moulded insulation produced according to my invention is lighter in weight and has greater covering capacity and higher insulating efficiency than similar material produced without its use.

While I have described in detail the application of my invention to the manufacture of eighty-five per cent. magnesia insulation, I have attempted to show and desire to have it understood that it is adapted for use with other porous products which may be made by mixing powdered, granular, flaky, fibrous or pulverulent material with water and then allowing the plastic mass to set by hydration, chemical reaction, or moulding under pressure. My invention also discloses a method of producing a stabilized foam or mass of stabilized bubbles which may be used for various purposes. While, in general, I find it advantageous to produce the minute stabilized bubbles within the plastic mixture, it is entirely feasible to prepare the stabilized foam separately and then incorporate it with suitable materials to increase their porosity.

I claim:

1. The process of making a relatively stable foam or mass of minute stabilized bubbles comprising mixing with water finely-divided calcium carbide, the particles of which are coated with a bubble-forming and stabilizing agent.

2. Granular calcium carbide, the grains of which are coated with a bubble-forming and stabilizing agent.

3. Finely-divided calcium carbide, the particles of which are coated with a bubble-forming and stabilizing agent.

4. Finely-divided calcium carbide, the particles of which are coated with a bubble-forming agent.

5. Finely-divided calcium carbide, the particles of which are coated with a bubble-stabilizing agent.

6. Molded heat insulation of high microporosity composed of light, finely-divided and/or fibrous materials, the voids thereof being surrounded by material containing a bubble-forming and stabilizing agent and calcium hydroxide.

7. Molded heat insulation of high microporosity composed of light, finely-divided and/or fibrous materials, containing a multiplicity of minute voids created prior to molding by reacting calcium carbide that has been coated with a bubble-forming and stabilizing agent with water to form a foam of minute bubbles containing gas, said voids being surrounded by material containing said bubble forming and stabilizing agent and calcium hydroxide.

8. Granular calcium carbide, the grains of which have been coated with a film-forming and stabilizing agent which also retards the generation of gas produced by reaction between the calcium carbide and water.

9. Finely-divided calcium carbide, the particles of which have been coated with a film-forming and stabilizing agent which also retards the generation of gas produced by reaction between the calcium carbide and water.

10. Heat insulation material of high micro-porosity molded under pressure in filter-molds from a semi-fluid mix containing a foam of emulsified acetylene gas comprising finely-divided solid ingredients thickly interspersed with minute dried bubbles of a gaseous emulsion, the material surrounding the multiplicity of voids created in said insulation by said dried bubbles containing minute quantities of a film-forming and stabilizing agent and calcium hydroxide.

11. Heat insulation material of high micro-porosity molded under pressure in filter-molds from a semi-fluid water mix containing a foam of emulsified acetylene gas comprising finely-divided magnesia and asbestos fiber thickly interspersed with minute dried bubbles of a gaseous emulsion, the material surrounding the multiplicity of voids created in said insulation by said dried bubbles containing minute quantities of a film-forming and stabilizing agent and calcium hydroxide.

12. The process of making molded heat insulation material of high micro-porosity comprising mixing finely-divided and/or fibrous solid materials with water to form a mix, generating gas therein by incorporating calcium carbide coated with a gas emulsifying agent, forming a relatively stable foam of minute bubbles of emulsified gas, and molding the mix, a multiplicity of the minute bubbles of emulsified gas being retained in the molded article.

13. In a process of making molded heat insulation material wherein finely-divided solid ingredients are mixed with water to form a semi-fluid mix, a gas being generated in water of the mix prior to molding the mix by a substance which generates gas by chemical reaction, the mix is molded in filter-molds with expulsion of water, and the molded forms are thereafter dried, the step comprising incorporating in water of the mix a gas-emulsifying agent and emulsifying said gas when generated in said water of the mix by chemical reaction so as to form a stable gaseous emulsion of minute pressure-resisting bubbles in water of said mix prior to molding said mix, a multiplicity of said bubbles of emulsified gas being substantially retained during said molding under pressure in filter-molds and a multiplicity of thickly interspersed minute voids being created in the dried product by said retained bubbles of said gaseous emulsion.

14. In a process of making heat insulation material wherein finely-divided solid ingredients including magnesia and fiber are mixed with water to form a semi-fluid mix, the mix is molded under pressure of about 25 to 50 pounds per square inch in filter-molds with expulsion of water, and the molded forms are thereafter dried, the step comprising generating acetylene gas in said mix in the presence of a gas emulsifying agent by chemical reaction between water of the mix and calcium carbide coated with a protective coating so as to form a stable gaseous emulsion of minute pressure-resisting bubbles of acetylene gas in said mix prior to molding, a multiplicity of said bubbles of emulsified gas being substantially retained during said molding under pressure in filter-molds and a multiplicity of thickly interspersed minute voids being created in the dried product by said retained bubbles of said gaseous emulsion.

15. In a process of making heat insulation material wherein finely-divided and/or fibrous materials are mixed with water to form a semi-fluid or plastic mix and the mix is molded, the step comprising generating acetylene gas in the mix in the presence of a gas emulsifying agent by chemical reaction between water of the mix and calcium carbide coated with a protective coating so as to form a stable gaseous emulsion of minute pressure-resisting bubbles of acetylene gas in said mix prior to molding, a multiplicity of said bubbles of emulsified gas being substantially retained during molding and a multiplicity of thickly interspersed minute voids being created in the molded product by said retained bubbles of said gaseous emulsion.

16. In a process of making heat insulation material wherein finely-divided and/or fibrous ingredients are mixed with water to form a semi-fluid mix, the mix is molded under pressure in filter-molds with expulsion of water and the molded forms are thereafter dried, the step comprising incorporating in water of the mix prior to molding the mix finely-divided calcium carbide coated with a gas-emulsifying agent thereby emulsifying acetylene gas as it is generated by reaction between the calcium carbide and the water so as to form a stable gaseous emulsion of minute pressure-resisting bubbles of acetylene gas in said mix prior to molding, a multiplicity of said bubbles of emulsified gas being substantially retained during molding and a multiplicity of thickly interspersed minute voids being created in the dried product by said retained bubbles of said gaseous emulsion.

17. In a process of making molded heat insulation material wherein finely-divided and/or fibrous materials are mixed with water to form a mix and the mix is molded, the step comprising incorporating in water of the mix prior to molding the mix calcium carbide coated with a bubble-forming and stabilizing agent thereby forming as acetylene gas is generated by reaction between the calcium carbide and the water a relatively stable intermixed foam containing a multiplicity of minute pressure-resisting bubbles of said gas in said mix prior to molding, said foam being substantially retained during molding and creating a multiplicity of thickly interspersed minute voids in the molded article.

18. In a process of making heat insulation material wherein finely-divided solid ingredients including magnesia are mixed with water to form a semi-fluid mix, the mix is molded under pressure in filter-molds with expulsion of water, and the molded forms are thereafter dried, the steps comprising incorporating in water of the mix prior to molding the mix calcium carbide coated with a bubble-forming and stabilizing agent thereby forming as acetylene gas as it is generated by reaction between the calcium carbide and the water a relatively stable intermixed foam containing a multiplicity of minute pressure-resisting bubbles of said gas in said mix prior to molding, and thereby substantially retaining said foam during molding and drying so as to create a multiplicity of thickly interspersed minute voids in the molded article.

19. A process of making a relatively stable gaseous emulsion containing minute stable bubbles of acetylene gas which comprises generating acetylene gas in the presence of a gas-emulsifying agent by chemical reaction between water and calcium carbide coated with a gas-emulsifying agent.

In testimony whereof, I have signed my name to this specification.

HAROLD W. GREIDER.

CERTIFICATE OF CORRECTION.

Patent No. 1,882,810.                                          October 18, 1932.

HAROLD W. GREIDER.

It is hereby certified that error appears in the printed specification of the above numbered patent requiring correction as follows: Page 1, line 35, for "particles" read particle; page 2, line 101, for "in" read is; page 3, line 111, for "advantageous" read permissible and same line after "also" insert the word be; page 4, line 75, for the compound word "double-forming" read bubble-forming; and that the said Letters Patent should be read with these corrections therein that the same may conform to the record of the case in the Patent Office.

Signed and sealed this 24th day of April, A. D. 1934.

Bryan M. Battey (Seal)                                           Acting Commissioner of Patents.